United States Patent
Viklund et al.

(10) Patent No.: US 12,551,948 B2
(45) Date of Patent: Feb. 17, 2026

(54) METHOD FOR PRODUCING A TOOL PART AND SUCH A TOOL PART

(71) Applicant: SANDVIK MACHINING SOLUTIONS AB, Sandviken (SE)

(72) Inventors: Per Viklund, Sandviken (SE); Anders Ohlsson, Sandviken (SE)

(73) Assignee: Sandvik Machining Solutions AB, Sandviken (SE)

( * ) Notice: Subject to any disclaimer, the term of this patent is extended or adjusted under 35 U.S.C. 154(b) by 883 days.

(21) Appl. No.: 17/772,575

(22) PCT Filed: Oct. 20, 2020

(86) PCT No.: PCT/EP2020/079441
§ 371 (c)(1),
(2) Date: Apr. 28, 2022

(87) PCT Pub. No.: WO2021/083725
PCT Pub. Date: May 6, 2021

(65) Prior Publication Data
US 2023/0001485 A1    Jan. 5, 2023

(30) Foreign Application Priority Data
Oct. 31, 2019   (EP) .................................... 19206530

(51) Int. Cl.
*B22F 10/28*    (2021.01)
*B22F 5/00*     (2006.01)
(Continued)

(52) U.S. Cl.
CPC ............... *B22F 10/28* (2021.01); *B22F 7/08* (2013.01); *B22F 10/00* (2021.01); *B23B 3/00* (2013.01);
(Continued)

(58) Field of Classification Search
CPC ...... B22F 2005/001; B22F 7/062; B22F 7/08; B22F 10/28
See application file for complete search history.

(56) References Cited

U.S. PATENT DOCUMENTS 4,063,939 A  * 12/1977  Weaver .................... B22F 5/04
                                                    419/60
4,872,500 A    10/1989  Duffey
(Continued)

FOREIGN PATENT DOCUMENTS

| CN | 1453087 A | 11/2003 |
|---|---|---|
| CN | 107097036 A | 8/2017 |

(Continued)

OTHER PUBLICATIONS

DE102016111934A1 English language translation (Year: 2018).*
Marinescu, Ioan D., et al. "Handbook of Machining with Grinding Wheels." (2016) (Year: 2016).*

*Primary Examiner* — Sally A Merkling
*Assistant Examiner* — Sean P. O'Keefe
(74) *Attorney, Agent, or Firm* — Corinne R. Gorski

(57) ABSTRACT

A method for producing a metal cutting tool component and a metal cutting tool component. The method includes the step of producing a front module having a main body and a front module interface at a rear end thereof, providing an intermediate element and building, using an additive manufacturing process, the main body on the build surface of the intermediate element. Further, a rear module including a coupling part at a rear end thereof and a rear module interface at a front end thereof is provided, and mounting the front module on the rear module by immovably connecting the front module and rear module interfaces, after the front module has been mounted on the rear module, machining at least one surface of the main body, and heat treating the intermediate element with the built main body, wherein at least the main body is hardened.

11 Claims, 6 Drawing Sheets

(51) Int. Cl.
*B22F 7/08* (2006.01)
*B22F 10/00* (2021.01)
*B23B 3/00* (2006.01)
*B23B 29/04* (2006.01)
*B23P 15/30* (2006.01)
*B33Y 10/00* (2015.01)
*B33Y 80/00* (2015.01)

(52) U.S. Cl.
CPC ............ *B23B 29/046* (2013.01); *B23P 15/30* (2013.01); *B22F 2005/001* (2013.01); *B33Y 10/00* (2014.12); *B33Y 80/00* (2014.12)

(56) References Cited

U.S. PATENT DOCUMENTS

| | | |
|---|---|---|
| 8,475,087 B2 | 7/2013 | Wihlborg et al. |
| 2018/0272432 A1 | 9/2018 | Jonsson et al. |
| 2019/0091771 A1 | 3/2019 | Schleicher |

FOREIGN PATENT DOCUMENTS

| | | |
|---|---|---|
| DE | 102016111934 A1 | 1/2018 |
| DE | 102017122054 A1 | 3/2019 |
| EP | 3238863 A1 * | 11/2017 |
| WO | 0053362 A1 | 9/2000 |
| WO | 0164377 A1 | 9/2001 |
| WO | 2019197281 A1 | 10/2019 |

* cited by examiner

METHOD FOR PRODUCING A TOOL PART AND SUCH A TOOL PART

RELATED APPLICATION DATA

This application is a § 371 National Stage Application of PCT International Application No. PCT/EP2020/079441 filed Oct. 20, 2020 claiming priority to EP 19206530.8 filed Oct. 31, 2019.

TECHNICAL FIELD

The present invention relates to a method for producing a metal cutting tool component, and to such a metal cutting tool component.

BACKGROUND

Traditionally, cutting tool components, such as for example a cutting tool body for carrying a cutting insert, are manufactured from a blank, normally of a suitable steel, aluminium or titanium. The blank is machined to its final shape within desired tolerances by suitable milling, turning, drilling and/or grinding operations. Since these operations can be time consuming and in order to avoid having to remove more material than necessary, often only a specific kind of blank is used for a specific kind of tool body. If it is intended to produce only a few tool bodies of the kind in question, it can be costly and cumbersome to create and produce suitable blanks. Likewise, it can be costly and cumbersome to prolong machining operations due to using a less suitable blank.

Therefore, it is desirable to be able to use an additive manufacturing process for tool bodies that are only going to be produced in a limited number. In some cases, the tool body comprises a standardised rear coupling part for connection with a complementary coupling part at another component or in a machine, and a front cutting head. Such tool bodies can be produced by building both the coupling part and the cutting head in the additive manufacturing process. Another option is to produce the coupling part separately by conventional production involving machining a coupling part blank, and then to build the cutting head on the coupling part. Normally, after the tool body, or a cutting head thereof, has been built in an additive manufacturing process, the tool body has to be heat treated in order to provide sufficient mechanical strength and wear resistance. A problem herewith is that the heat treating process can affect tolerances of dimensions of the coupling part.

SUMMARY

It is an object of the present invention to at least partly obviate the above-mentioned problems. This object is achieved according to the invention by means of the disclosed method and tool component.

According to a first aspect of the present invention, there is provided a method for producing a metal cutting tool component, comprising the steps of
producing a front module, the front module comprising a main body and a front module interface at a rear end, comprising the steps of
providing an intermediate element, comprising providing the front module interface at a rear end and a build surface at a front end thereof, and
building, using an additive manufacturing process, the main body on the build surface of the intermediate element,
providing a rear module comprising providing a coupling part at a rear end and a rear module interface at a front end,
after producing the front module and providing the rear module, mounting the front module on the rear module by immovably connecting the front module interface and the rear module interface,
after the front module has been mounted on the rear module, machining at least one surface of the main body, and
heat treating the intermediate element with the built main body, wherein at least the main body is hardened.

Thus, the method comprises providing an intermediate element by means of which it is possible to provide the metal cutting tool component in form of connectable modules. The interface between the front module and the rear module does not need to comply with tight tolerances. Instead, it is sufficient that the interface provides a reliable connection so that the modules can be secured immovable relative each other. Thereby, the main body can be built on the build surface of the intermediate element to form the front module. After the front module has been produced, the front module is mounted on the rear module through connecting the front and rear module interfaces. Specifically, the interfaces of the modules are arranged to immovably connect the modules. Thereafter, at least one surface on the main body is machined. Thus, the surface is machined to the desired dimensions and alignments only after the modules have been connected. This is also advantageous in that the rear module can be used to carry the front module to a machining station where the at least one surface of the font module is machined.

Furthermore, the front module is heat treated separate from the rear module, so that the rear module, which may have portions, such as for example the coupling part, that are sensitive to the heat treatment process, does not need to be subjected thereto. During heat treatment of the front module, at least the main body is hardened.

According to a second aspect of the present invention, there is provided a metal cutting tool component comprising
a front module, the front module comprising a main body, which has been manufactured by an additive manufacturing process and hardened, and a front module interface at a rear end,
a rear module, which has a coupling part at a rear end and a rear module interface at a front end, wherein
the front module and the rear module are immovably connected at the front module interface and the rear module interface, and wherein
the main body comprises at least one machined surface.

Thanks to the cutting tool component comprising two modules, it is possible to produce the them separately, connect them and machine at least one surface one the main body in accordance with the inventive method. Furthermore, front module can be heat treated for hardening the main body when it is separated from the rear module, so that not to affect any dimensions of the rear module by the heat treatment. Thereby a tool that complies with narrow tolerances and that is cost-efficient to produce also when produced in a limited number is achieved.

The tool component that is produced by the inventive method can be a front part of a cutting tool, such as including a cutting head that comprises cutting edges or seats for cutting inserts. The tool component can also be a holder, or part of a holder for carrying for example a cutting head. It is also possible that the tool component is an extension part or an adapter, or in itself constitutes the metal cutting tool. Thus, the metal cutting tool component is a component to be used in an arrangement for cutting metal. While the arrangement is suitable for cutting metal, it could also be used for cutting other materials, such composites.

The method steps for producing the front module can be performed in any suitable order unless the order is specified in the claim. Thus, the intermediate element can be provided as a complete component with the front module interface and the build surface, or the intermediate element can be provided as a blank and thereafter the front module interface and/or the build surface are produced. For example, the build surface can be machined after the intermediate element has been provided, the front module interface can be produced, for example through conventional machining, before or after the main body has been built, and/or before or after hardening. In embodiments, the intermediate element and the main body are both built using an additive manufacturing process, for example in separate processes or in a single, continuous process.

Similarly, the rear module can be provided as a complete component with the rear module interface and the coupling part, or the rear module can be provided as a blank and thereafter the rear module interface and the coupling part are produced. For example, the rear module is provided as blank including the coupling part, and then the interface is produced, for example through conventional machining. However, once the coupling part is produced, according to the inventive method, it is advantageously not necessary to subject the rear module to hardening or other operations that could affect the dimensions of the coupling part.

The rear module can be of any suitable material such as metal, for example steel.

The coupling part can be one of the parts in a coupling comprising two complementary parts, such as one of the parts in a rounded triangular coupling known as a Capto® coupling (the cone or the aperture), thread coupling, or dovetail coupling. However, also other components can be necessary to complete the coupling, such as for example locking parts in form of screws or clamps.

The front module is mounted on the rear module by immovably connecting the front module interface and the rear module interface. The connection at the interface can be releasable, or a semi-permanent or permanent connection.

Machining the at least one surface and/or any other features of the front module or rear module, can include milling, turning, drilling, grinding or boring, for example. Preferably, the machining includes machining to precise tolerances.

In embodiments, the surface and possibly other parts of or the entire metal cutting tool component can be subjected to one or several steps of post processing. These can include steps of turning, milling, drilling, blasting, grinding, finishing, coating, electrical discharge machining, cladding and/or measuring operations.

Preferably, the step of building the main body comprises using an additive manufacturing process in form of powder bed fusion of a printable and hardenable steel powder. Such method advantageously allows to use an intermediate element of a steel material that can be conventionally machined and to print the main body on the build surface. Preferably, the main body and the intermediate element comprises the same, printable steel material. In another preferred method, direct energy deposition (DED), powder is depositioned on a surface. A laser is used to fuse the steel powder with the build surface and with powder in layers below. However, also an E-beam can be used.

In an additive manufacturing method in form of binder jet printing, an object cannot connect to a build surface directly during printing. This must be done for example by sintering or by a mechanical joint after the object has been built. Such methods are less preferred while still possible.

The step of hardening can be performed by any suitable hardening process that achieves the desired properties for the material in question. The hardening process is heating. Desired material properties can be a certain mechanical strength and/or wear resistance.

The powder can be any powdered material that is suitable for the cutting tool component, that can be used in the additive manufacturing method and that is hardenable. Preferably, the powder is a printable steel powder, for example maraging steel powder. For powder bed fusion, the nominal powder size is typically 10 μm-70 μm. For electron beam fusion, the nominal powder size is typically 45 μm-110 μm. For a DED process, the nominal powder size is typically 50 μm-110 μm.

Due to the inventive method comprising producing two connectable modules, the front module can comprise a printable material that is not compatible to be printed on top of the rear module with the coupling part.

Preferably, the step of hardening comprises heating to 450° C.-600° C. The heating can take place for any suitable time. Normally, heat treating for hardening lasts for from a few minutes to several hours depending on the temperature. This achieves good mechanical strength for the preferred powder of printable and hardenable maraging steel.

Preferably, the step of machining at least one surface of the main body is performed after the step of hardening the intermediate element with the built main body. This is advantageous in that any dimensional deviations or misalignments caused by the additive manufacturing method and/or hardening can be accounted for.

In other embodiments, for example where the front module is realisably connected to the rear module at the interface, the front module can be connected to the rear module before being hardened. Thereafter, the at least one surface of the main body is machined. Then, the front module is disconnected and hardened separate from the rear module. Thereafter, the front module can be connected to the same or another rear module. These embodiments are advantageous because machining of the at least one surface takes place in a softer state of the main body. The embodiments are most suitable for main body materials that deform only very little during hardening or for applications that do not need tight tolerances.

According to embodiments, the step of providing the rear module with the coupling part comprises providing a coupling part that has a reference axis, and the step of machining comprises machining the at least one surface to an exact position and extension relative the reference axis. Thereby it can advantageously be ensured that the surface is exactly positioned and aligned with respect to other surfaces or parts that also are positioned relative the reference axis. Preferably, when the rear module is coupled with a complementary coupling part, the reference axis coincides with or has a known relation to a reference axis of the complementary coupling part. Then, the at least one surface can be machined to be exactly positioned and aligned with respect to other surfaces or parts of the component with the complementary coupling part that are positioned relative their reference axis.

The reference axis will usually be normal to a dividing plane between the metal cutting tool component and the component it is to be coupled with. Normally, the reference axis is normal to also a dividing plane between the front module and the rear module at the interface. The reference axis can be an axis that the active surfaces of the coupling part are located and aligned with reference to. For example, in a thread coupling or in a conical, rounded triangular coupling known as a Capto® coupling, the reference axis is a central axis of the thread or the Capto® cone/aperture. In a dovetail coupling, the reference axis is an axis normal to the dividing plane. In embodiments where the main body and the intermediate element are centred around a common longitudinal axis, the common longitudinal axis and the reference axis normally coincide. In other embodiments, the reference axis of the coupling part can extend with an angle to a longitudinal axis of the intermediate element and/or the main body. In embodiments, the intermediate element can have a substantial extension in a transverse direction to the longitudinal axis of the main body. In such embodiments, the reference axis of the coupling part can for example extend in parallel with the longitudinal axis of the main body.

In the present application, the term axis of an object is not limited to the length of the object, instead it may be necessary to continue an axis in order for it to coincide with or form an angle with another axis.

In embodiments, the main body is built in form of a cutting head, and machining the surface comprises machining a support surface for a cutting insert. A corresponding inventive tool component comprises such a cutting head. The cutting head, for example, can be a cutting head of a milling tool, drilling tool, boring tool or turning tool. This method is advantageous when it is desired to have a metal cutting tool component that has a cutting head specifically designed for a specific purpose. Thanks to these method steps, such a tool component can be produced in a time-efficient and cost-efficient manner and with the same tolerances of coupling parts and cutting edge locations as in conventionally machined tool components.

However, in other embodiments machining the at least one surface can comprise machining part surfaces of front coupling parts or guide surfaces, for example.

According to embodiments, the step of providing the rear module with the coupling part comprises providing the coupling part in form of a part of a releasable machine tool coupling. Thus, the metal cutting tool component can be a part of a tool that is to be connected to a machine, for example a machine tool, such as a CNC machine, for milling, turning, drilling and/or grinding of work pieces of for example metal or composites.

Preferably, the coupling part is a part of a releasable machine tool coupling wherein at least one surface has dimensional deviations less than +/−50 µm, preferably less than +/−20 µm and more preferably less than +/−5 µm.

Examples of couplings in form of a part of a releasable machine tool coupling are a conical, rounded triangular coupling known as a Capto® coupling, HSK coupling, Steep taper coupling, Big Plus coupling, or an ISO cone coupling. Thereby, advantageously the at least one machined surface on the main body can be machined to be close to or comply with desired tolerances relative the position of the machine interface. Thus, in embodiments where the main body is a cutting head, the inserts seats can be machined to be aligned and positioned relative a reference axis of the releasable machine tool coupling part and thereby also relative the machine. In other embodiments, the rear module coupling part can also be used for coupling the metal tool component to other parts than a machine, such as for example an extension part or an adapter. Also in such embodiments, it can be important that surfaces on the main body are aligned and positioned carefully with respect to the component comprising the complementary coupling part.

According to embodiments, the step of providing the intermediate element comprises the step of providing an intermediate element, which has a planar build surface with a central build surface normal. The central build surface normal can be aligned with, or extend with an angle to or in parallel with the reference axis of the coupling part of the rear module.

According to example embodiments, where the central build surface normal extends with an angle to the reference axis, the step of building the main body on the build surface comprises arranging the intermediate element with the central build surface normal in a vertical direction, and thereafter building the main body on the build surface.

By using such an intermediate element and arranging it according to this method step, it is possible to produce the main body in a vertical direction even though it may extend with an angle to the reference axis of the coupling part and possibly also to a central longitudinal axis of the intermediate element. For example, the central build surface normal can extend with an angle to a reference axis of 45°-90°. Thus, if the reference axis coincides with the longitudinal axis of the intermediate element, a main body can be produced in a vertical direction even though it extends with such a large angle to the longitudinal axis of the intermediate element. Thanks to providing such an intermediate element, advantageously a main body having parts that extend with an angle of 45°-90° to each other can be produced by additive manufacturing. Generally, in additive manufacturing, it is difficult to build bodies with larger angles than 45° to the vertical without support structures, which renders production more complex. Therefore, in additive manufacturing, it is regarded difficult to produce bodies having parts with more than 45° angle relative each other.

In example embodiments of the cutting tool component, the main body has a front portion with a central front portion longitudinal axis, and the coupling part has a reference axis, wherein the central front portion longitudinal axis extends with an angle to the reference axis or in parallel beside the reference axis. For example, the central front portion longitudinal axis can extend with an angle to the reference axis of 45°-90°. These are desired shapes that can be achieved in a cost-efficient manner through the inventive production method.

However, the invention is also beneficial for traditional shapes where the central front portion longitudinal axis is aligned with the reference axis.

According to embodiments, the front module interface at the intermediate element can be arranged in a rear surface that has a rear surface normal. In embodiments, the rear surface normal of the intermediate element can coincide with the reference axis of the coupling part of the rear module. In embodiments, the build surface normal and the rear surface normal can be aligned or extend at an angle to each other or in parallel beside each other.

According to embodiments, the step of providing the intermediate element comprises the steps of providing an intermediate element blank of maraging steel and machining the intermediate element blank to form the front module interface and the build surface. Thus, according to this embodiment, the intermediate element is produced separately and by using conventional subtractive machining operations on the steel blank. Due to the intermediate element comprising maraging steel, the intermediate element is suitable for use in the inventive production method comprising building a main body by an additive method using the same type of material and subsequent hardening. The material of the intermediate element renders the intermediate element suitable for building the main body on top of the build surface through powder bed fusion using printable maraging steel powder, because the steel of the build surface will melt and fuse together with the powder so that the front module forms an integral unit. Then, when the intermediate element in a later step is hardened together with the built main body, the intermediate element and the main body react in the same way to the hardening process.

Another advantage with this embodiment is that the intermediate element can function as support for printing the main body so that detachment steps that are common in the prior art for detaching a printed object from a build platform is obviated. Furthermore, the intermediate element can advantageously also function as a support for carrying the main body from a print station to a hardening station.

The front module interface and the rear module interface can be of any kind that eliminates movement between the front and rear module when connected to each other. In embodiments, the interface is releasable so that the front and rear module can be disconnected. The interface can be self-locking or inhibiting relative movement of the modules by additional means such as screws or clamps. For some applications, the tolerances that can be achieved with the interface are sufficient for the at least one surface to be machined when the front module is mounted on a first rear module. Then, the front module is disconnected and hardened. Thereafter, the front module can be transferred to a second rear module for being used therewith. In other embodiments, the front module and the rear module are permanently and mutually immovable connected at the interface. The modules can be connected permanently or semi-permanently by locking screws, welding, soldering, adhesives or similar.

According to example embodiments, the step of providing the intermediate element with the front module interface comprises providing the front module interface in form of serrations in a rearward facing rear surface, and the step of providing the rear module with the rear module interface comprises providing the rear module interface in form of serrations in a forward facing front surface, wherein the serrations are complementary to the serrations of the front module interface. Furthermore, a preferred embodiment of the metal cutting tool compromises such interfaces. This is a reliable, simple interface that can provide sufficient tolerances for most applications of the invention. Preferably, the modules are immovably held together at the interface by screws that press a set of serrations at the rear end of the front module against a complementary set of serrations at a front end of the rear module. Such interface can be released by unlocking the screws so that the modules can be separated again. However, it is also possible to use permanently locking screws that cannot be unscrewed.

In embodiments of a metal cutting tool component produced by the inventive method, the front module comprises 3D printed, hardened maraging steel and the rear module comprises conventionally manufactured steel.

BRIEF DESCRIPTION OF THE DRAWINGS

In the following, example embodiments will be described in greater detail and with reference to the accompanying drawings, in which.

Figure 1:
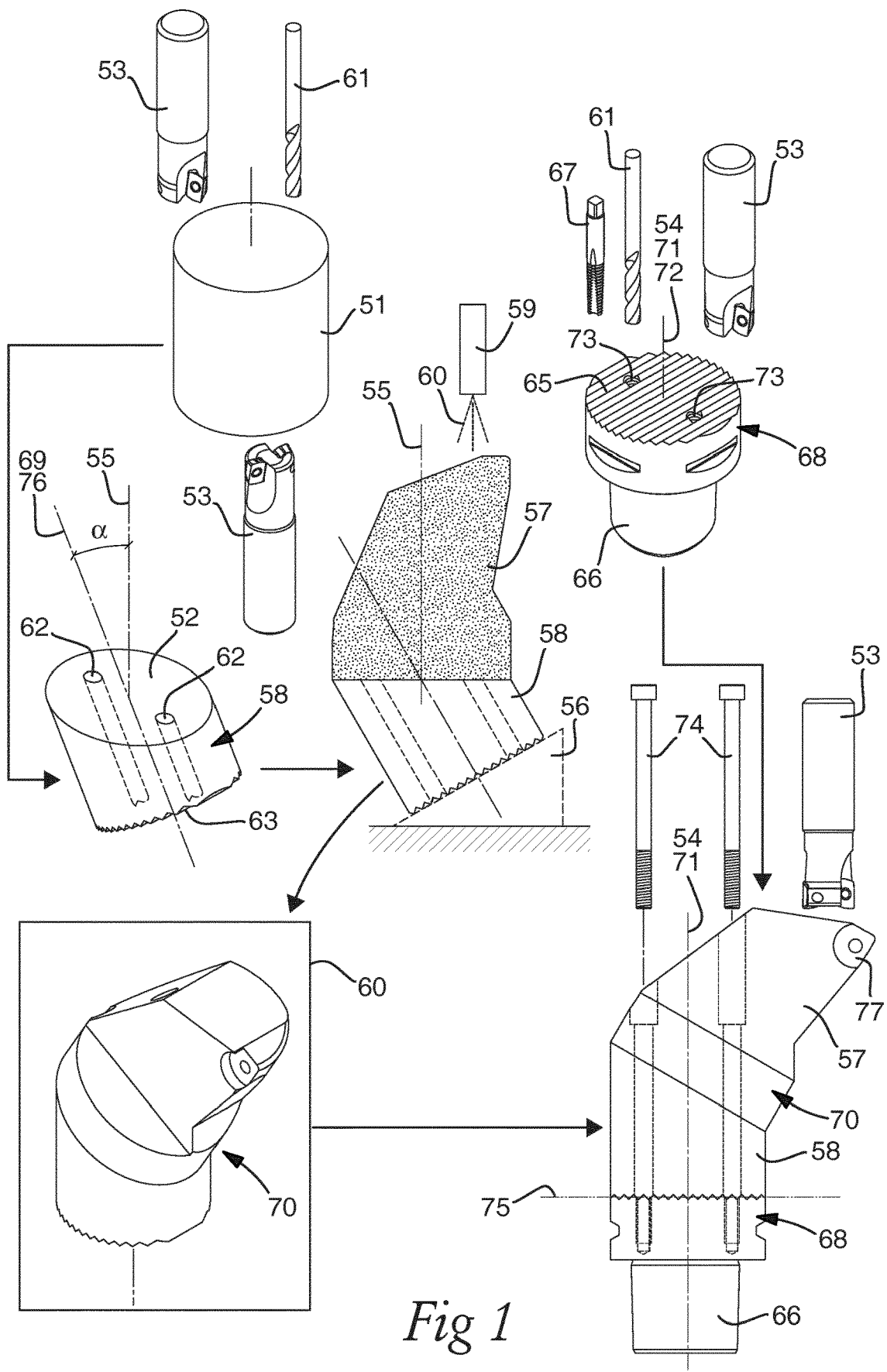
FIG. 1 is a schematic view of an embodiment of the production method for producing a metal cutting tool component in form of a cutting tool comprising a cutting head.

All the figures are schematic, not necessarily to scale, and generally only show parts which are necessary in order to elucidate the respective embodiments, whereas other parts may be omitted or merely suggested. Unless otherwise indicated, like reference numerals refer to like parts in different figures.

Figure 2:
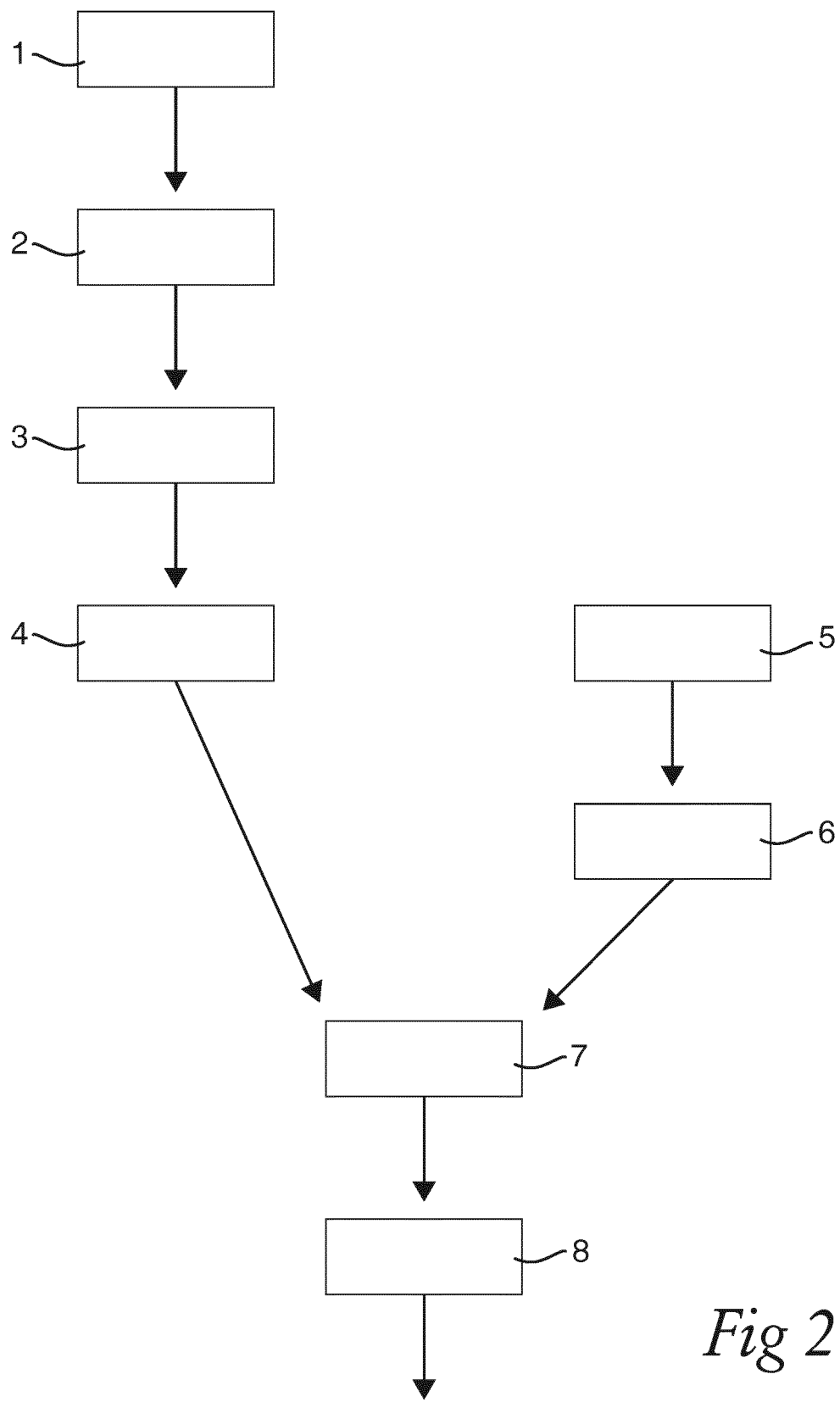
FIG. 2 is a flow chart of the embodiment schematically illustrated in FIG. 1.

With reference to FIGS. 1 and 2, in the following a first example embodiment of the method for producing a metal cutting tool component, which comprises a front module 70 and a rear module 68, will be described.

In step 1, an intermediate element blank 51 is provided. The blank 51 comprises a printable maraging steel and is a solid, cylindrical element. However, the intermediate element blank 51 can have any suitable shape, such as a square or rectangular cylinder, and can have cavities.

In step 2, the intermediate element blank 51 is machined. A milling tool 53 is used to shape a build surface 52 at a front end and to shape a front module interface 63 in form of serrations in a rear end surface. The serrations form a set of alternating elongated ridges and grooves. The set in the example embodiment includes a plurality of straight ridges extending across the rear end surface. A drill 61 is used to drill two through holes 62 through the intermediate element blank 51. By these machining operations an intermediate element 58 is provided.

The intermediate element 58 has an axis, which in the example embodiment coincides with a central longitudinal axis 76 of the intermediate element. The serrations that form the front module interface 63, are formed in a planer rear end surface. The plane of the rear end surface will, when the front module 70 is connected to the rear module 68, be parallel to a dividing plane between the modules at the interface. The plane of the rear end surface has a central rear end surface normal 69 that in the example embodiment coincides with the central longitudinal axis 76 of the intermediate element 58. The build surface is machined to be planar and to extend at an angle to the plane of the rear end surface. A central build surface normal 55 extends with an angle a of 50° to the central rear end surface normal 69. The two through holes 62 extend generally in parallel with the central longitudinal axis 76 from the build surface 52 at the front end to the front module interface 63 at the rear end.

In step 3, the intermediate element 58 is placed in an arrangement for powder bed fusion of a printable and hardenable steel powder and the main body 57 is printed on the build surface 52. The intermediate element 58 is placed with the build surface normal 55 extending in a vertical direction. The printing arrangement includes support devices 56 for securely holding the intermediate element 58 in this position.

The printing method includes spreading powder on the build surface in layer after layer. A laser 59 with a laser beam 60 is arranged to travel over each layer and to fuse the powder to the build surface 52 or, for consecutive layers, with layers below. In the example embodiment, the powder used for building the main body 57 is the same material that the intermediate element 58 comprises. In the example embodiment, the main body 57 is built in form of a cutting head for a turning tool in the printing method.

When the step of building the main body 57 is finished, the intermediate element 58 with the built main body 57 is in step 4 placed in an apparatus 60 for hardening. During hardening, the intermediate element 58 with the built main body 57 is heated to 500° C. This achieves good mechanical strength for the main body comprising the preferred printable and hardenable maraging steel. The feature that is subjected to most stress during use is often the insert seat or the through holes. So, the intermediate element 58 with the build main body has to be hardened to a level that ensures sufficient strength of the most sensible features By the steps 1-4 a front module 70 is produced.

A rear module blank is provided in step 5. The blank comprises steel, for example 25CrMo4 (SS 2225), 16MnCrS5 (20MnCrS5) (SS 2127), 34CrNiMo6 (SS 2541) or X40CrMoV5-1 (SS 2242) ER-chucks. Normally, the rear module blank s a solid, cylindrical element. However, the rear module blank can have any suitable shape, such as a square or rectangular cylinder, and can have cavities.

In step 6, the rear module blank is machined. The milling tool 53 is used to shape a rear module interface 65 in form of serrations in a front end surface and a coupling part 66 at rear end. The serrations form a set of alternating, elongated ridges and grooves. The set in the example embodiment includes a plurality of straight ridges extending across the front end surface.

A drill 61 is used to drill two holes 73 in the rear module blank 64 and the holes 73 are threaded with a thread cutting tool 67. By these machining operations a rear module 68 is provided.

The coupling part includes the reference axis 54, which in the example embodiment coincides with a central longitudinal axis 71 of the rear coupling part 66. In the example embodiment, the coupling part is a part of a Capto® coupling, namely a Capto® cone. The serrations that form the rear module interface 65, are formed in a planar front end surface. The planer front end surface has a central front end surface normal 72 that in the example embodiment coincides with the reference axis 54 and the central longitudinal axis 71 of the rear coupling part 66. The two threaded holes 73 extend generally in parallel with the reference axis 54 and rearwards from the rear module interface 65 at the front end surface. The threaded holes 73 are positioned with respect to the serrations of the rear module interface 65 such that they will be aligned with the through holes 62 of the front module 70 when the modules 68, 70 are connected at their interface 63, 65.

After the front module 70 and the rear module 68 have been produced, in step 7, the front module 70 and the rear module 68 are assembled. The front module 70 and the rear module 68 are positioned with their interfaces 63, 65 facing each other. The reference axes 54 of modules 68, 70 are aligned and the modules 68, 70 are placed in mutual angular position for enabling the front module interface 63 and the complementary rear module interface 65 to engage. Then, the front module 70 and the rear module 68 are pushed together, wherein the serrations at their interfaces 63, 65 mesh together. Therein, centering features engage. Two screws 74 are inserted in one through hole 62 each and tightened in their threaded holes 73. Thanks to the interfaces comprising serrations in form of elongated ridges and grooves, and thanks to the pressure provided by the tightened screws, any minor deviations in tolerances in a few single ridges or grooves will not affect the mutual position of the front module and the rear module. Furthermore, the serrations at the interfaces 63, 65 and the tightened screws 74 ensure that front module 70 and the rear module 68 are reliable positioned and mutually immovable, i.e. immovable connected. A dividing plane 75 between the front module 70 and the rear module 68 can be defined at the interface. The dividing plane 75 has a central normal that coincides with the reference axis 54, the central longitudinal axis 76 of the intermediate element 58, the central rear end surface normal 69 of the planer rear end surface with the serrations in the front module interface 63 at the rear end and a central front end surface normal 72 of a planer front end surface with the serrations in the rear module interface 65 at the front end.

In step 8, at least one surface of the front module 70 is machined. The milling tool 53 is used to shape support surfaces in an insert seat 77 for a cutting insert. The support surfaces are carefully machined to have a position and extension within required tolerances relative the reference axis 54.

By these method steps, a metal cutting tool component in form of a turning tool comprising a cutting head and with a Capto® coupling part at a rear end is provided. If desired, the screws 74 can be released, and the front module 70 can be mounted on another rear module 68. However, the another rear module 68 should correspond closely to the original real module in order for the support surfaces of the insert seat 77 to keep their tolerances with respect to the reference axis 54.

Figure 3:
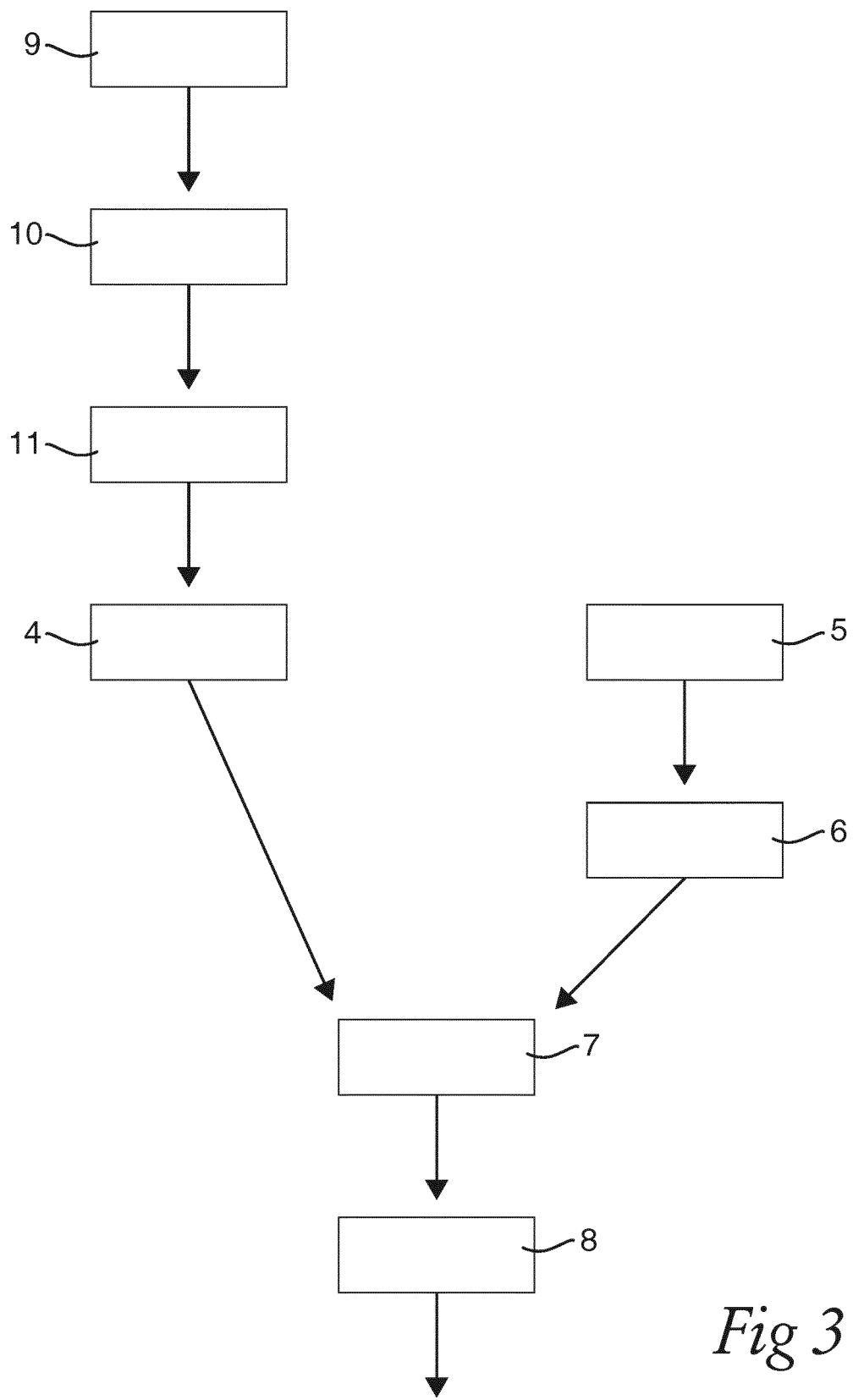
FIG. 3 is a flow chart of a second example embodiment of the method for producing a metal cutting tool component.

With reference to FIG. 3, a second example embodiment of the method for producing a metal cutting tool component, which comprises a front module 70 and a rear module 68, will be described.

In step 9, the intermediate element 58 is printed by an arrangement for powder bed fusion comprising a build platform. The printing method includes spreading powder of a printable and hardenable steel powder on the build platform surface in layer after layer. A laser with a laser beam is arranged to travel over each layer and to fuse the powder to the build platform or, for consecutive layers, with layers below. Hereby the intermediate element 58 including the front module interface 63 in form serrations in the rear end surface and the build surface 52 at the front end is formed. In this embodiment, the built surface 52 constitutes the last printed layer of the intermediate element.

Then, in step 10, the main body 57 is printed on the build surface 52. Step 10 essentially corresponds to step 3 according to the first embodiment of the method. However, the intermediate element 58 in this second embodiment is already in position in the arrangement for powder bed fusion so that for building the main body 57 the process of printing layer after layer continuous without interruption after the intermediate element 58 has been built. Alternatively, the intermediate element 58 is tilted so that the build surface normal 55 extends in a vertical direction before starting printing of the main body 57. The same powder is used for the main body 57 as for the intermediate elopement 58.

Alternatively, the intermediate element is produced with an additive manufacturing process separate from the main body. Therein, the intermediate element can be printed in a different arrangement, or in the same arrangement with different settings, and/or with a different powder. In other embodiments, the intermediate element 58 including the build surface is printed, but the front module interface in form serrations in the rear end surface is machined afterwards.

In step 11, the intermediate element 58 with the built main body 57 is detached from the build platform. This is done by electrical discharge machining (EDM).

Thereafter, the same steps 4-8 are performed as in the first embodiment of the method for producing a metal cutting tool component described above.

In further alternative embodiments, the intermediate element 58 instead of being provided as a blank 51 or printed, is provided as finished, element produced by any suitable method.

Figure 4:
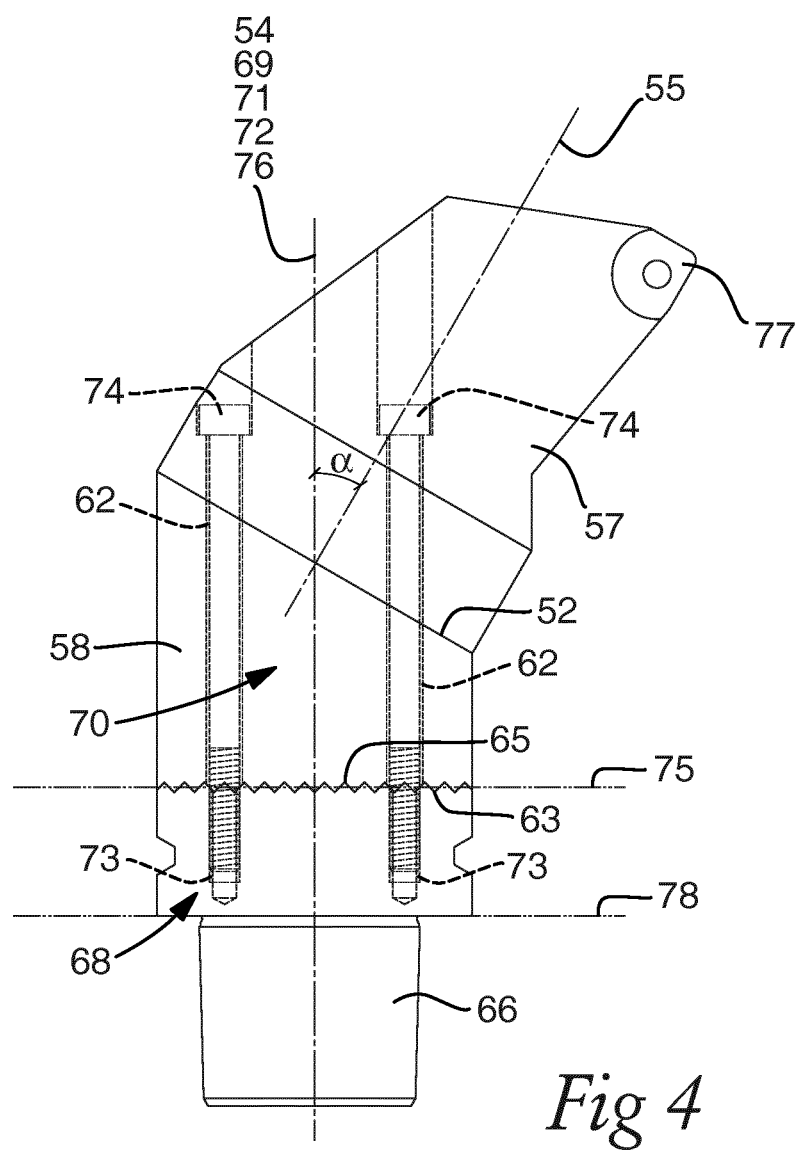
FIG. 4 is a schematic view of an embodiment of a metal cutting tool component in form of a turning tool comprising a cutting head.

In FIG. 4, an embodiment of a metal cutting tool component in form of a turning tool comprising a cutting head according to the present invention is shown. The turning tool comprises a front module 70 and a rear module 68. The front module 70 has an intermediate element 58 at a rear end and a main body 57 at a front end. The intermediate element 58 has been machined from a blank 51, the main body 57 has been printed by the additive manufacturing process and hardened as described above in connection with the first or second embodiments of the method.

The intermediate element 58 has an interface 63 in form of serrations that are formed in a rearward facing, planar rear end surface. The serrations form a set of alternating elongated ridges and grooves, which are straight and extend across the rear end surface. The intermediate element 58 comprises a planar build surface 52 with a central build surface normal 55.

The main body 57 extends forward from the build surface 52. At the most forward end of the main body 57, an insert seat 77 is provided.

The rear module 68 has a rear module interface 65 in form of serrations that are formed in a forward facing, planar front end surface. The serrations form a set of alternating elongated ridges and grooves, which are straight and extend across the front end surface.

The rear module 68 further comprises a coupling part 66 at a rear end. In the example embodiment, the coupling part is a part of a Capto® coupling, namely a Capto® cone. The coupling part 66 includes the reference axis 54, which in the example embodiment coincides with a central longitudinal axis 71 of the rear coupling part 66, which axis also is the central longitudinal axis of the rear module 68.

Support surfaces in the insert seat 77 of the main body 57 are carefully machined to have a position and extension within required tolerances relative the reference axis 54.

Two holes extend longitudinally and in parallel with the reference axis 54 in the cutting tool component. The two holes each comprises an unthreaded portion 62 extending through the main body 57 and the intermediate element 58, and a threaded portion 73 extending in the rear module 68 rearward from the forward facing front surface with the serrations. Two screws 74 are inserted in one hole each. Each screw 74 extends through the unthreaded portion 62 and is tightened in threaded portion 73. Due to the complementary serrations of the interfaces 63, 65 being meshed and pressed together by the tightened screws 74, the front module 70 and the rear module 68 are mutually immovable connected. In other embodiments another number of screws and corresponding holes are used, such as for example three or four.

A dividing plane 75 between the front module 70 and the rear module 68 can be defined at the interface 63, 65. The reference axis 54 coincides with a central normal of the dividing plane 75, the central longitudinal axis 76 of the intermediate element 58, the central rear end surface normal 69 of the planer rear end surface with the serrations in the front module interface 63, a central longitudinal axis 71 of the rear coupling part 66, and a central front end surface normal 72 of a planer front end surface with the serrations in the rear module interface 65. In this embodiment, the central build surface normal 55 forms an angle α of 45° the reference axis 54.

A second dividing plane 78 can be defined at the rear coupling part 66, which is a plane that separates the metal cutting tool component from the component it is intended to be coupled with, when it tis coupled thereto.

In FIGS. 5-10, embodiments of metal cutting tool components produced by the method described above are shown.

FIGS. 5-9 show different embodiments of a metal cutting tool component in form of a turning tool with a coupling part 66 in form of a releasable machine tool coupling comprising a Capto® coupling cone. However, in other not shown embodiments, the tool component can be a cutting tool of a different kind, such as milling tool or a drill. Furthermore, other not shown embodiments can have other coupling parts 66 than a Capto® coupling cone, such as for example a HSK coupling.

The following description will focus on describing the intermediate element 58 because the embodiments shown in FIGS. 5-9 differ mainly by different design thereof. In all embodiments, the rear end surface of the front module interface 63 and the front end surface of the rear module interface 65 are parallel with the dividing plane 75 so that all these three surfaces have a common normal direction 79.

Figure 5:
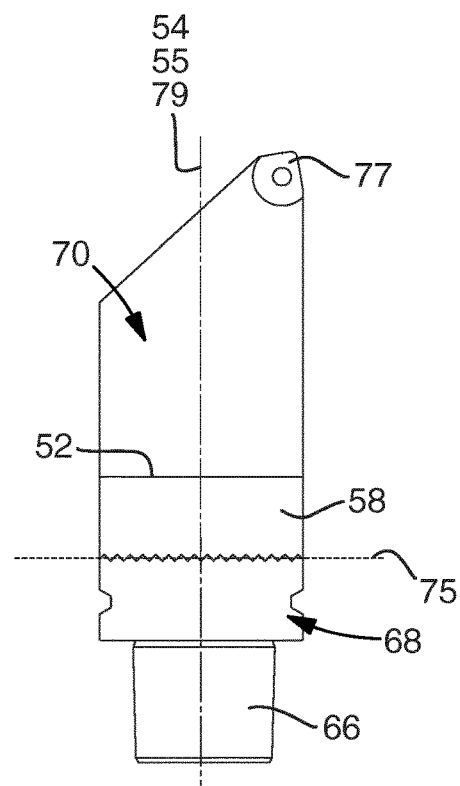
FIGS. 5-10 are schematic views of embodiments of metal cutting tool components produced by the method according to the first or second embodiment.
Figure 6:
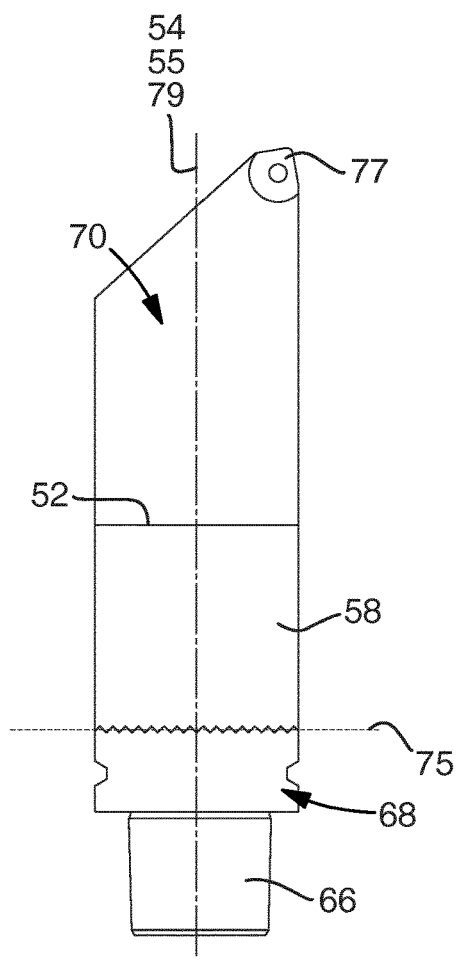

The turning tool shown in FIGS. 5 and 6 differ from the turning tool described with reference to FIG. 4 in that they both have an intermediate element 58 where the build surface 52 and the dividing plane 75 are parallel. The coupling part 66 has a reference axis 54, which is the central axis of the Capto® coupling cone and extends in the common normal direction 79. The build surface normal 55 is aligned with (coincides with) the reference axis 54. The rear module 68 and front module 70 have the reference axis 54 as a common longitudinal axis. FIGS. 5 and 6 differ only in that in FIG. 5 the intermediate element 58 is a thin disc, while in FIG. 6 the intermediate element 58 is an elongated cylinder contributing to the length of the turning tool.

Figure 7:
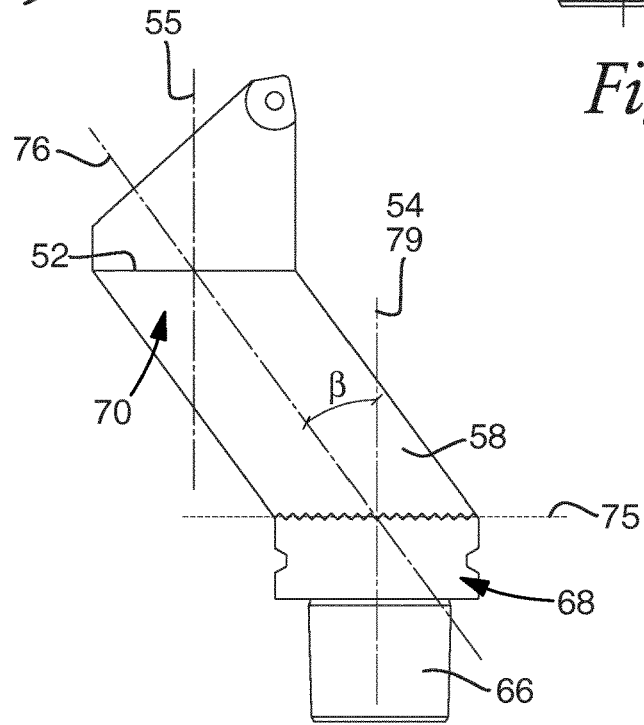

The turning tool of FIG. 7 has an intermediate element 58 which has the shape of a circular, oblique cylinder. The build surface 52 and the dividing plane 75 are parallel. The coupling part 66 has a reference axis 54, which is the central axis of the Capto® coupling cone and extends in the common normal direction 79. The central build surface normal 55 extends in parallel with and beside the reference axis 54. A central longitudinal axis 76 of the intermediate element 58 extends with an angle β of 45° to the reference axis 54.

Figure 8:
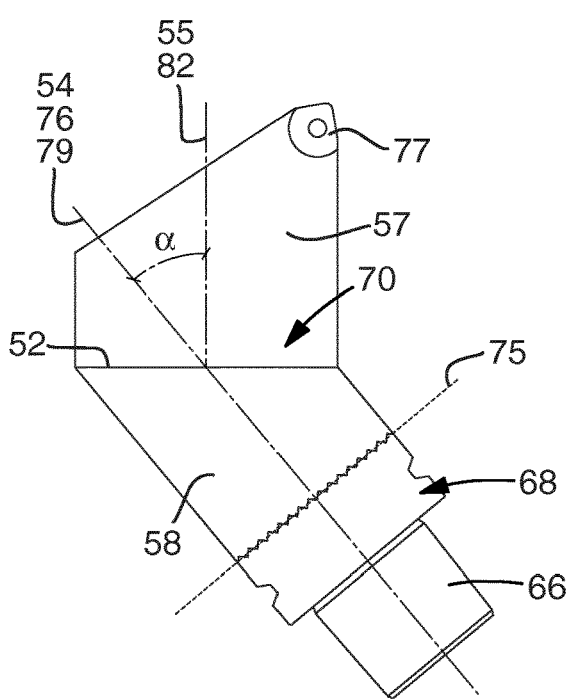

The turning tool shown in FIG. 8 is similar to the tool that has been described in connection with the first and second embodiments of the production methods and with reference to FIGS. 1-3, and FIG. 4. The intermediate element 58 has the shape of a circular cylinder that has been obliquely capped at an end, wherein the build surface 52 is formed in that end. The build surface 52 extends at angle to the dividing plane 75. The coupling part 66 has a reference axis 54, which is the central axis of the Capto® coupling cone and extends in the common normal direction 79. The longitudinal axis 76 of the intermediate element 58 extends in the common normal direction 79, too. The central build surface normal 55 extends with an angle α of 50° to the reference axis 54. Furthermore, a central longitudinal axis 82 of the main body, i.e. a central front portion longitudinal axis 82, coincides with the central build surface normal 55 and thus has the same angle α to the reference axis 54.

Figure 9:
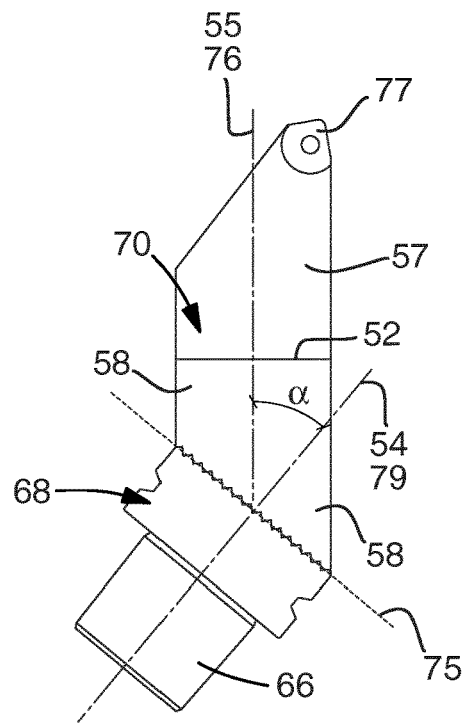

The turning tool shown in FIG. 9 differs from the turning tool shown in FIG. 8 in that the intermediate element 58 has the shape of a circular cylinder that has been obliquely capped at an end, wherein the interface 63 is formed in that end. The coupling part 66 has a reference axis 54, which is the central axis of the Capto® coupling cone and extends in the common normal direction 79. The central build surface normal 55 extends with an angle α of 50° to the reference axis 54. The longitudinal axis 76 of the intermediate element 58 coincides with the central build surface normal 55 and thus extends with the same angle α to the reference axis 54.

Figure 10:
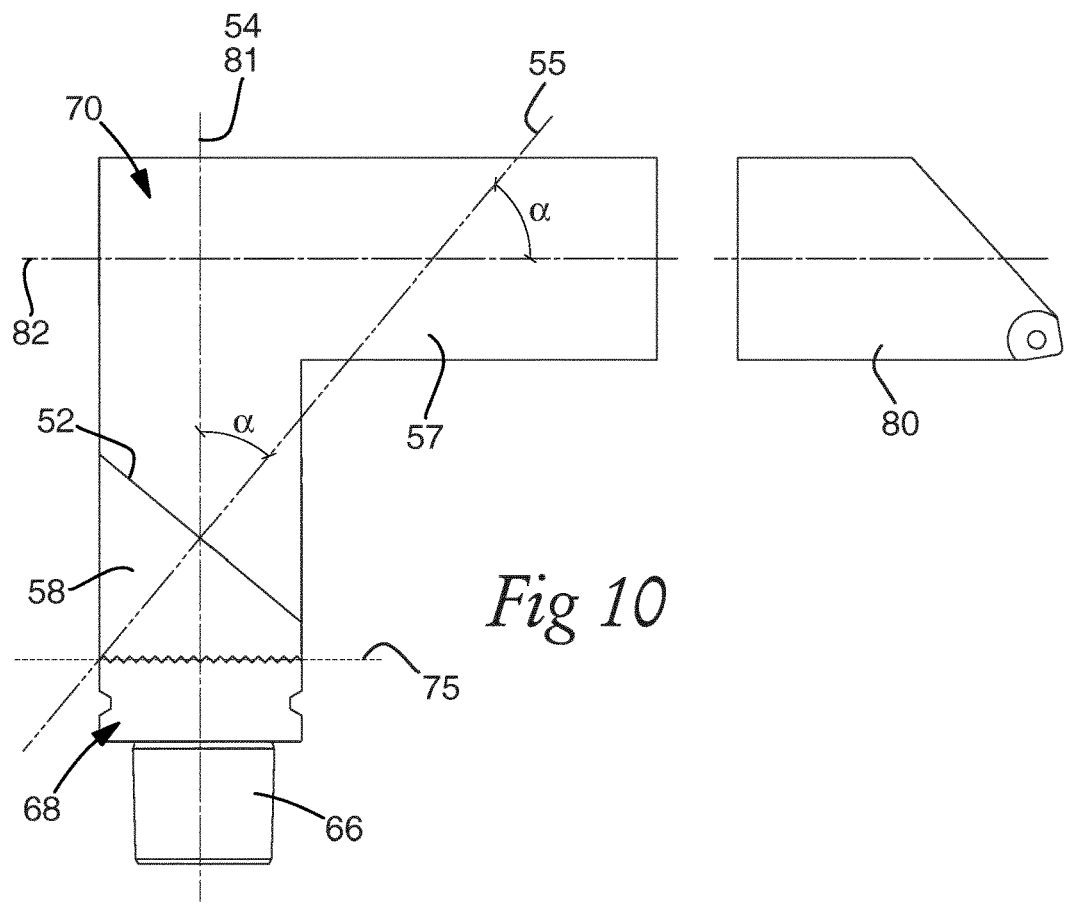

In FIG. 10, a metal cutting tool component in form of a holder for carrying a separate unit 80 in form of cutting head is shown. The intermediate element 58 and the rear module 68 are similar to the intermediate element 58 described with reference to the turning tool of FIGS. 4 and 8. The main body 57 has the shape of two circular cylinders connected at right angles, wherein the first cylinder has a first central longitudinal axis 81 and the second cylinder has a second central longitudinal axis 82, i.e. a central front portion longitudinal axis 82. However, the longitudinal axes of both cylinders extend with an angle α of 45° to the build surfaces normal 55. Thanks to being able to print the main body on a horizontal build surface 52, both parts can be printed without additional support even though they extend with 90° to each other.

The invention claimed is:

1. A method for producing a metal cutting tool component, comprising the steps of:
    producing a front module, the front module including a main body and a front module interface, comprising the steps of:
        providing an intermediate element, comprising providing the front module interface at a rear end of the intermediate element and a build surface at a front end of the intermediate element; and
        building, using an additive manufacturing process, the main body on the build surface of the intermediate element;
    providing a rear module comprising providing a coupling part at a rear end of the rear module and a rear module interface at a front end, of the rear module;
    after producing the front module and providing the rear module, mounting the front module on the rear module by immovably connecting the front module interface and the rear module interface;
    after the front module has been mounted on the rear module, machining at least one surface of the main body; and
    heat treating the front module, wherein at least the main body is hardened, wherein the front module is heat treated separately from the rear module.

2. The method according to claim 1, wherein the step of building the main body comprises using an additive manufacturing process in form of powder bed fusion of a printable and hardenable steel powder.

3. The method according to claim 2, wherein the step of heat treating comprises heating to 450° C.-600° C.

4. The method according to claim 1, wherein the step of machining at least one surface of the main body is performed after the step of heat treating the intermediate element with the built main body.

5. The method according to claim 1, wherein the step of providing the rear module with the coupling part comprises providing a coupling part that has a reference axis, and wherein the step of machining comprises machining the at least one surface to an exact position and extension relative the reference axis.

6. The method according to claim 5, wherein the step of building the main body comprises building a main body in form of a cutting head, and the step of machining the at least one surface comprises machining at least one support surface for a cutting insert.

7. The method according to claim 5, wherein the step of providing the rear module with the coupling part comprises providing the coupling part in form of a part of a releasable machine tool coupling.

8. The method according to claim 7, wherein the step of providing the coupling part in the form of a part of a releasable machine tool coupling comprises providing at least one surface of the releasable machine tool coupling part that has dimensional deviations less than +/−50 μm.

9. The method according to claim 1, wherein the step of providing the intermediate element comprises the step of providing an intermediate element, which has a planar build surface with a central build surface normal, wherein the front module interface is arranged at a rear end surface of the intermediate element, wherein the rear end surface has a rear surface normal, and wherein the central build surface normal extends with an angle to the rear surface normal, and the step of building the main body on the build surface comprises arranging the intermediate element with the central build surface normal in a vertical direction, and thereafter building the main body on the build surface.

10. The method according to claim 1, wherein the step of providing the intermediate element comprises the steps of providing an intermediate element blank of maraging steel, and machining the intermediate element blank to form the front module interface and the build surface.

11. The method according to claim 1, wherein the step of providing the intermediate element with the front module interface comprises providing the front module interface in form of serrations in a rearward facing rear surface, and wherein the step of providing the rear module with the rear module interface comprises providing the rear module interface in form of serrations in a forward-facing front surface, wherein the serrations of the rear module interface are complementary to the serrations of the front module interface.

* * * * *